United States Patent [19]

Wagai et al.

[11] Patent Number: 5,285,493

[45] Date of Patent: Feb. 8, 1994

[54] RADIO TELE-COMMUNICATION DEVICE WITH RECEIVED MESSAGE DISPLAYING FEATURE

[75] Inventors: Kiyoshi Wagai; Tatsuaki Sekigawa, both of Hachioji; Shinya Sato, Hino; Mitsuji Shiono, Oome; Haruhiko Sato, Hachioji, all of Japan

[73] Assignee: Kabushiki Kaisha Toshiba, Kawasaki, Japan

[21] Appl. No.: 719,071

[22] Filed: Jun. 25, 1991

Related U.S. Application Data

[63] Continuation of Ser. No. 467,509, Jan. 19, 1990, abandoned.

[30] Foreign Application Priority Data

Jan. 19, 1989 [JP]  Japan ...................................... 1-8708
Jan. 19, 1989 [JP]  Japan ...................................... 1-8709

[51] Int. Cl.⁵ ..................... H04M 11/00; G09G 1/02; G08B 5/22
[52] U.S. Cl. ....................................... 379/58; 379/61; 379/63; 345/156; 345/193
[58] Field of Search ...................... 379/53, 56, 57, 58, 379/61, 63; 340/799, 825.44

[56] References Cited

U.S. PATENT DOCUMENTS

| | | | |
|---|---|---|---|
| 4,028,500 | 6/1977 | McClure et al. | 379/63 |
| 4,412,217 | 10/1983 | Willard et al. | 340/825.44 |
| 4,536,761 | 8/1985 | Tsunoda et al. | 340/825.44 |
| 4,633,041 | 12/1986 | Boivie et al. | 379/354 |
| 4,639,723 | 1/1987 | Boughton | 340/799 |
| 4,660,032 | 4/1987 | Tsunoda | 340/825.44 |
| 4,661,659 | 4/1987 | Nishimura | 379/61 |
| 4,674,112 | 6/1987 | Kondraske et al. | 379/86 |
| 4,682,148 | 7/1987 | Ichikawa et al. | 340/311.1 |
| 4,850,009 | 7/1989 | Zook et al. | 379/96 |
| 4,855,731 | 8/1989 | Yoshizawa et al. | 340/825.44 |
| 4,965,569 | 10/1990 | Bennett et al. | 340/825.44 |
| 4,988,991 | 1/1991 | Motegi | 340/825.5 |
| 4,996,715 | 2/1991 | Marui et al. | 455/33 |
| 5,023,905 | 6/1991 | Wells et al. | 379/96 |
| 5,043,718 | 8/1991 | Shimura | 340/825.44 |

FOREIGN PATENT DOCUMENTS

| | | | |
|---|---|---|---|
| 3309832 | 9/1984 | Fed. Rep. of Germany | 379/61 |
| 3329267 | 2/1985 | Fed. Rep. of Germany | 379/58 |
| 0010824 | 1/1985 | Japan | 455/31 |
| 2216319 | 4/1989 | United Kingdom | 379/61 |

OTHER PUBLICATIONS

British Telecommunications Engineering vol. 8, Jan. 1990 p. 270, "New Pagers for Business".

*Primary Examiner*—Jin F. Ng
*Assistant Examiner*—William D. Cumming
*Attorney, Agent, or Firm*—Oblon, Spivak, McClelland, Maier & Neustadt

[57] ABSTRACT

A tele-communication device includes a memory for storing a plurality of pieces of messages transmitted over a communication channel and a display device for displaying the message information read from the memory in response to an operation of a display switch. The pieces of message information are automatically read from the memory in sequence at regular intervals and displayed on the display device while the display switch is depressed continuously. When the display time of a message exceeds a given time, the message is automatically erased from the display. When the display switch is depressed within a given time from when the message is erased automatically, the erased message is displayed again.

6 Claims, 8 Drawing Sheets

RADIO TELE-COMMUNICATION DEVICE WITH RECEIVED MESSAGE DISPLAYING FEATURE

This application is a continuation of application Ser. No. 07/467,509, filed on Jan. 19, 1990, now abandoned.

BACKGROUND OF THE INVENTION

1. Field of the Invention

The present invention relates to radio telecommunication devices with a feature for displaying received messages, such as a pager receiver, a mobile telephone or a cordless telephone.

2. Description of the Related Art

As a new type of a paging system, a system has recently been developed in which a base station transmits message information, and one of the pager receivers subscribed to this system displays the message information. A paging signal used in this system is formed as follows. That is, one frame is time-divided into a plurality of groups each of which is time-divided into a synchronization word and a plurality of calling words. In each calling word are inserted an identification (ID) code and a message code.

When calling a pager receiver, a caller dials a telephone numbers assigned to the pager receiver, thus reaching the base station and transmits message information to the base station. Then the base station generates the ID code assigned to the selected pager receiver and the message code corresponding to the message information. The ID code and the massage code are inserted into one of an empty calling words in a group to which that pager receiver belongs among a plurality of groups in one frame and transmitted to the pager receiver.

On the other hand, the pager receiver is arranged as follows. That is, the paging signal transmitted from the base station is received by a radio circuit through an antenna and demodulated by a demodulation circuit for subsequent application to a control circuit. The control circuit checks the I code contained in the demodulated paging signal with the self-ID code previously stored an ID-ROM. When a coincidence occurs between the codes, the control circuit recognizes the generation of a call to the self-receiver to produce a ringing signal which is applied to a loudspeaker via a driving circuit. A ringing tone is emanated from the loudspeaker, whereby the user is informed that a call has been made to him.

Upon the occurrence of a coincidence between the ID codes, the control circuit enters the message code received following the ID code. After being subjected to an error correcting process, the message code is decoded and the decoded message data is applied to a display driving circuit. Consequently the message is displayed on a liquid crystal display (LCD) by the display driving circuit. Therefore, the user can understand the message from the caller through the liquid crystal display at the time of generation of the call. The display message is erased from the liquid crystal display when the user depresses a stop switch.

The message code is displayed on the liquid crystal display and transferred from the control circuit to a message memory to be stored therein. The message memory consists of a random access memory (RAM) which has areas required to store a plurality of message codes. When the user depresses a display switch with message codes stored in the message memory, a message code is read from the message memory by the control circuit. The read message code is decoded by the control circuit and then applied to the display driving circuit so that it is displayed on the liquid crystal display. Even after the display of a message on the liquid crystal display has been erased, therefore, the user can read the message from the message memory to watch it on the display by depressing the display switch.

However, such a conventional receiver only has a received message displaying feature in which only one message code is read from the message memory and displayed on the display each time the display switch is depressed once. Where many message codes are stored in the message memory, therefore, the display switch might have to be operated many times so as to display a desired message code, causing trouble to display operations.

SUMMARY OF THE INVENTION

It is an object of the present invention to provide a radio tele-communication device which permits the retrieval and display of a desired message easily and quickly with a small number of display operations.

It is another object of the present invention to provide a radio tele-communication device which permits the retrieval of all of messages stored in a message memory by only one operation of a display switch.

It is still another object of the present invention to provide a radio tele-communication device which permits automatic erasing of a message displayed on a display without any display stopping operation.

It is a further object of the present invention to provide a radio tele-communication device in which, even after a message has been erased from a display, the same message can be displayed again with a small number of display operations.

It is a still further object of the present invention to provide a pager receiver which permits quick retrieval of a desired message to display it, thereby reducing power consumption for message display operations to suppress the consumption of a battery.

It is another object of the present invention to provide a pager receiver which can shorten time required to retrieve and display a message, thereby minimizing the effect on other operations associated with reception of a paging signal.

It is still another object of the present invention to provide a radio telephone which permits quick retrieval and display of a desired message, thereby reducing power consumption in message display operation to suppress the consumption of a battery.

It is a further object of the present invention to provide a radio telephone which can shorten time required to retrieve a message for display, thereby minimizing the effect on other operations associated with reception of a called signal.

To attain the above objects, a radio telecommunication device comprises a receiving circuit for receiving a signal containing a message; a storage circuit having areas for storing a plurality of received messages; a display device for displaying at least received messages; a display switch for entering a display instruction; and a display control circuit. Responsive to the display instruction's being continuously entered for a first time or more by operating the display switch, the display control circuit sequentially reads a plurality of messages stored in the storage circuit at intervals of a second time for display on the display.

Consequently, according to the present invention, the messages are sequentially read from the storage circuit and displayed on the display at second time intervals by continuing depressing the display switch. For this reason, the user can retrieve and display a desired message by only one operation of the display switch. Thus, the operability of the device for the user can be improved. In addition, the time required to retrieve and display the desired message or the time required to retrieve all the messages stored in the storage circuit can be shortened. Hence, the retrieval of the messages can be made easy.

Another radio tele-communication device of the present invention includes a display control circuit, a display erasing circuit and a redisplay control circuit in addition to the receiving circuit, the storage circuit, the display and the display switch. Responsive to an display instruction entered from the display switch, the display control circuit selectively reads the messages stored in the storage circuit for display on the display. The display erasing circuit allows a message displayed on the display to be erased. The redisplay control circuit allows the erased message to be redisplayed on the display when the display switch is operated within the first time from when the message is erased by the display erasing circuit.

Consequently, according to the present invention, when the first time elapses from when a message starts being displayed, the message is automatically erased from the display. This obviates the necessity for the user to perform an operation to erase the message. Even if the message has been erased, an operation of the display switch within the second time will allow the erased message to be displayed again. This obviates the necessity of reretrieval of the storage circuit from the beginning in order to redisplay the erased message, reducing the number of times of operations of the display switch so that the operability for displaying received messages is improved. In addition, the erased message can be redisplayed within a short time, improving the retrieval efficiency.

With a pager receiver and a radio telephone of the present invention, in response to application of an display instruction from the display switch for the first time or more, the display control circuit sequentially reads a plurality of messages stored in the storage circuit at intervals of the second time and displays them on the display.

With another pager receiver and radio telephone, the display control circuit sequentially reads a plurality of massages stored in the storage circuit and displays them on the display in response to a display instruction from the display switch. The display erasing circuit allows the message displayed on the display to be erased. Moreover, the display control circuit allows the erased message to be redisplayed on the display within the first time from when the message is erased by the display erasing circuit.

According to the present invention, therefore, the retrieval efficiency of received messages and the operability for displaying the received messages can be improved. Moreover, since the time required to retrieve and display the received message can be shortened, the power consumption can be reduced correspondingly. Thus, the consumption of the battery can be suppressed, increasing the life of the battery. In addition, since the time required to retrieve and display a received message is shortened, the time spent by the control circuit for display operations is reduced. Hence, the calling operation will be little affected by the display operation.

BRIEF DESCRIPTION OF THE DRAWINGS

FIGS. 4 to 6B are flowcharts of the control procedure and control contents of the control circuit of the pager receiver shown in FIG. 1;

DETAILED DESCRIPTION OF THE PREFERRED EMBODIMENTS

First Embodiment

Figure 1:
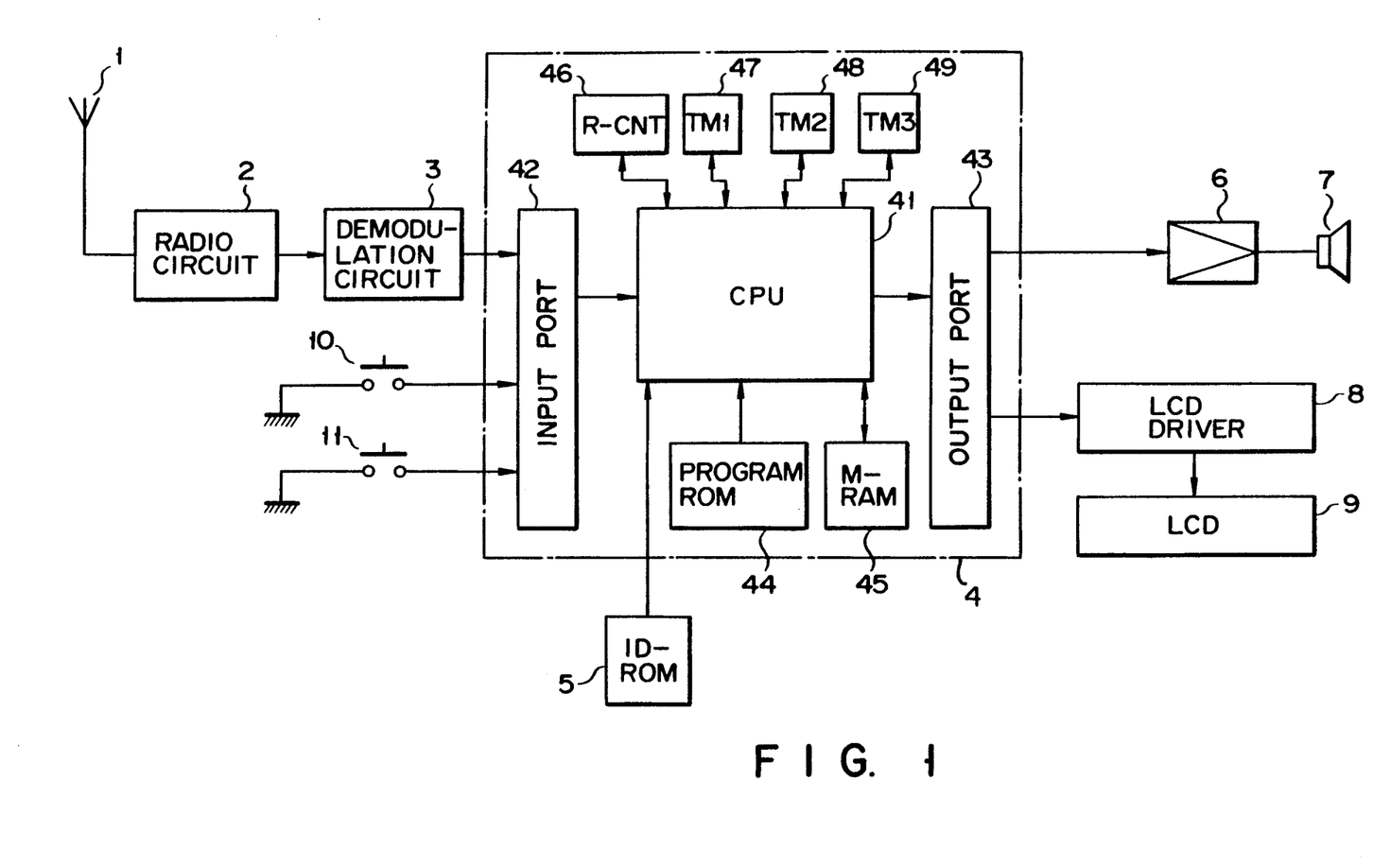
FIG. 1 is a block diagram of a pager receiver according to a first embodiment of the present invention.

A specific embodiment in which the present invention is applied to a pager receiver will be first described. FIG. 1 is a block diagram of the pager receiver according to the first embodiment.

A paging signal transmitted from a base station not shown is received by a radio circuit 2 through an antenna 1 and then applied to demodulator circuit 3 for demodulation. The demodulated paging signal is fed into a control circuit 4 which may be formed of a microcomputer as shown. The microcomputer is provided with a central processing unit (CPU) 41, an input port 42, an output port 43, a program ROM 44, a message memory (M-RAM) 45, a readout counter (R-CNT) 46 and three timers 47 to 49. CPU 41 executes predetermined control operations in accordance with a program previously stored in program ROM 44. An ID-ROM 5 is connected to CPU 41. In ID-ROM 5 is written an ID code previously assigned to the pager receiver. Each of pager receivers is assigned a separate ID code in advance.

To input port 42 are connected demodulation circuit 3, a stop switch 10 and a display switch 11 which are each formed of a push button switch. Each of those switches is adapted to produce a signal of a duration corresponding to a time of period during which it is depressed. To output port 43 are connected a loudspeaker driving circuit 6 and an LCD driving circuit 8. Loudspeaker driving circuit 6 responds to a driving signal output from CPU 41 via output port 43 to produce a ringing signal which is applied to a loudspeaker 7 to sound a ringing tone. Responsive to message data output from CPU 41 via output port 43, LCD driving circuit 9 displays a message corresponding to the message data on a liquid crystal display (LCD) 9.

Figure 2:
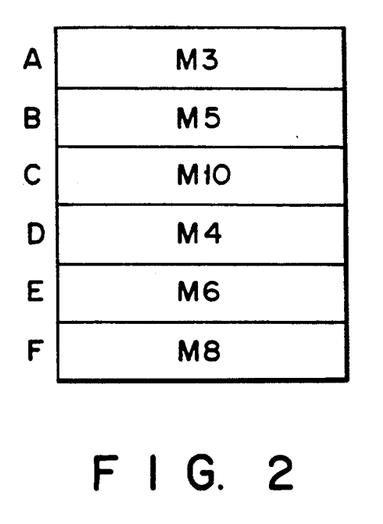
FIGS. 2 and 3 illustrate storage areas of the message memory of the pager receiver shown in FIG. 1.
Figure 3:
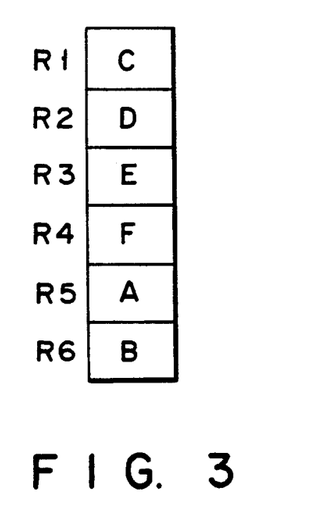

Message memory 45 is formed of a RAM. The RAM has six first storage areas which are assigned addresses are A to F as shown in FIG. 2 by way of example and six second memory areas which are assigned addresses R1 to R6 as shown in FIG. 3. Each of the first storage areas is adapted a to store one receive message code. In the example of FIG. 2, message codes M3, M5, M10, M4, M6 and M8 are stored in the storage areas of addresses A to F, respectively. In the second storage areas the addresses A to F of the first storage areas, in which the message codes are stored, are stored in the order of reception of the message codes. In the example of FIG. 3, the addresses C, D, E, F, A and B of the first storage areas are sequentially stored in the respective second storage areas of addresses R1 to R6.

Readout counter 46 is adapted to designate the addresses R1 to R6 of the second storage areas in displaying the messages stored in the first storage areas in sequence.

Each of timers 47, 48 and 49 is formed of a counter by way of example. Each of those counters has a separate count upper limit value set beforehand. Timers 47, 48 and 49 start a count operation at a time when they receive count start signals from CPU 41 and produce time-out signals when their counts reach previously set corresponding upper limit count values.

Figure 4:
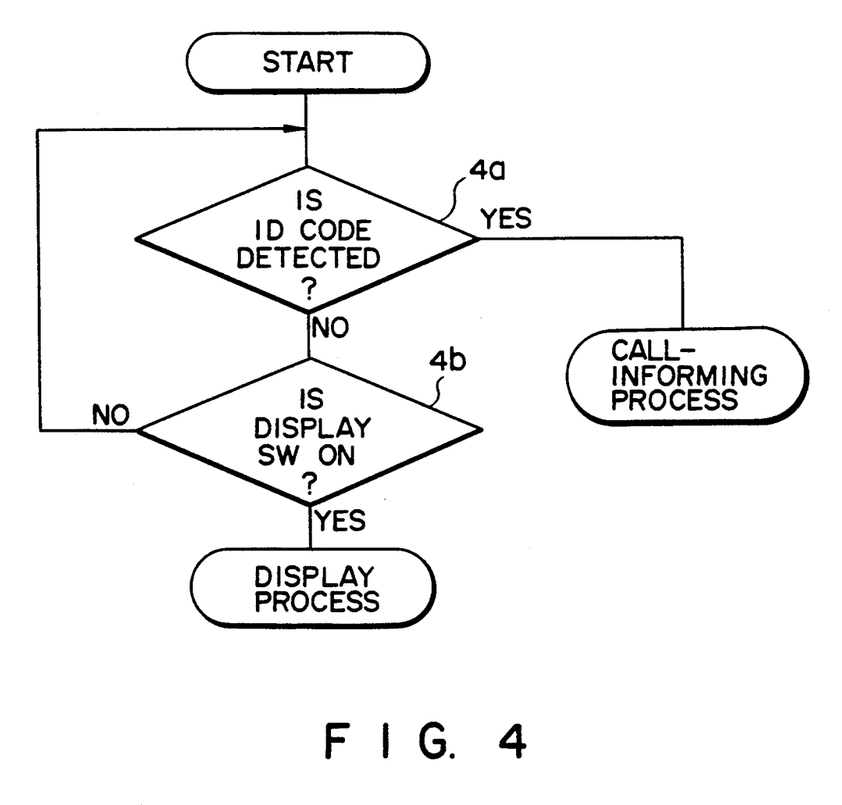

The operation of the pager receiver arranged as described above will be described below. In the call waiting state, CPU 41 repeatedly performs step 4a of detecting the ID code and step 4b of detecting whether display switch 11 has been depressed or not as shown in FIG. 4.

When a coincidence occurs between the ID code contained in the received paging signal and the self ID code stored in ID-ROM 5, CPU 41 decides that a call has been made to the receiver of its own, carrying out a call informing process.

Figure 5A:
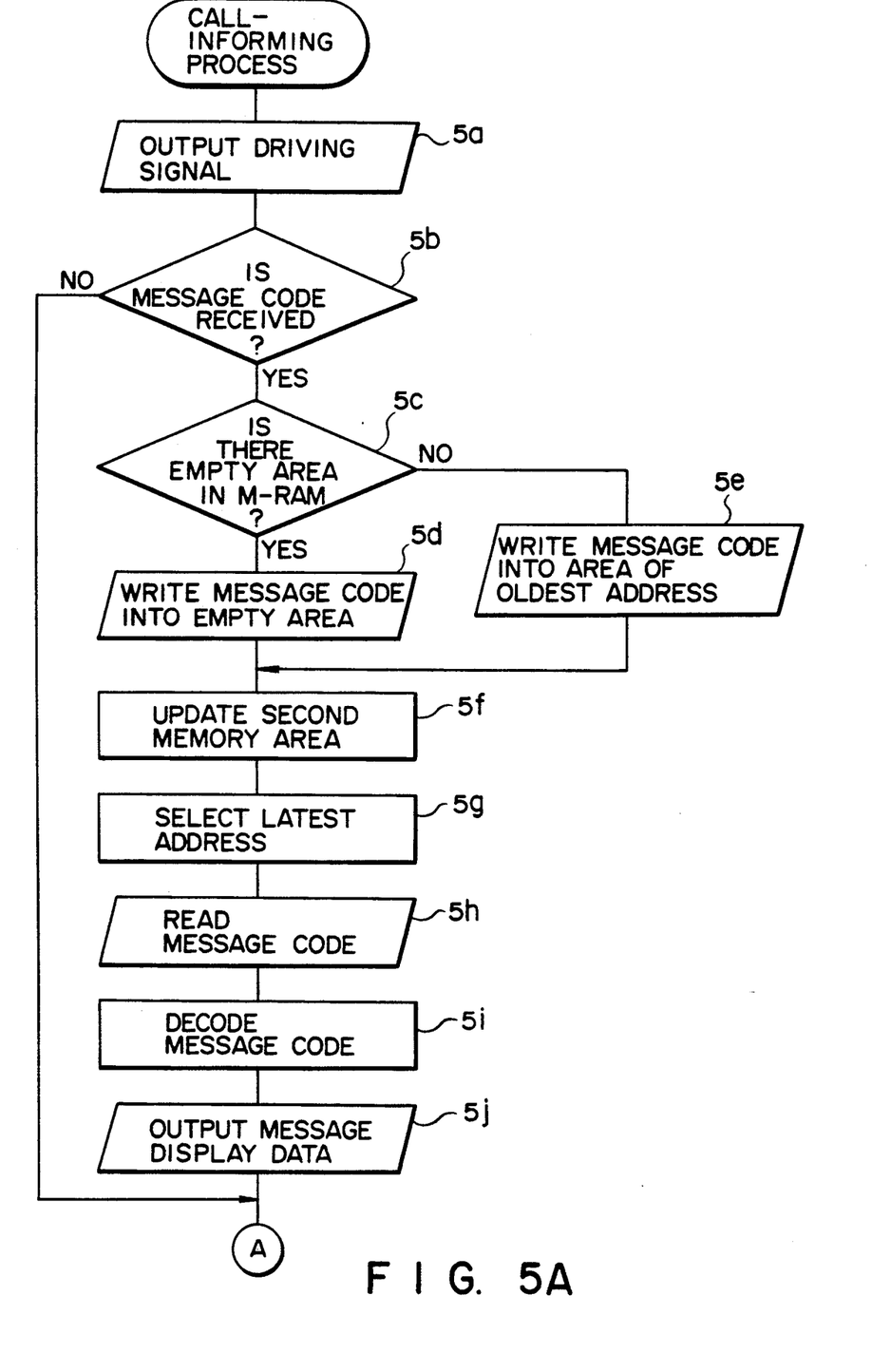

That is, as shown in FIG. 5A, a driving signal is first applied to loudspeaker driving circuit 6 in step 5a. As a result, a ringing signal is output from loudspeaker driving circuit 6 so that a ringing tone is emanated from loudspeaker 7. Thus, owning to the ringing tone the user can be informed that a call has been made to him. In subsequent step 5b, a decision is made as to whether or not a message code is received. When the receipt of the message code is detected, step 5c is carried out next. In step 5c, a decision is made as to whether or not there is an empty area in the first memory area of M-RAM 45. When there is an empty area, the message code is written into the empty area in step 5d. When there is no empty area, on the other hand, step 5e is performed next. In step 5e, the message code which is the oldest in the order of receipt among message codes stored in the first memory area is replaced with the new message code just received.

When the new message code is thus written into the first memory area, CPU 41 carries out step 5f next. In step 5f, the contents of the second memory area of M-RAM 45 are updated. CPU 41 subsequently carries out a process of displaying the newly received message code on LCD 9. That is, in step 5g, an address of the first memory area that stores the latest message code is selected from the contents of the second memory area. In subsequent step 5h, an area corresponding to the selected address is accessed so that the message code is read from the accessed area. In subsequent step 5i, the message code is decoded. Message display data resulting from the decoding is output to LCD driving circuit 8 in step 5j. Thus, the message received just now is displayed on LCD 9. The user can therefore understand the message from the caller by watching LCD 9.

Figure 5B:
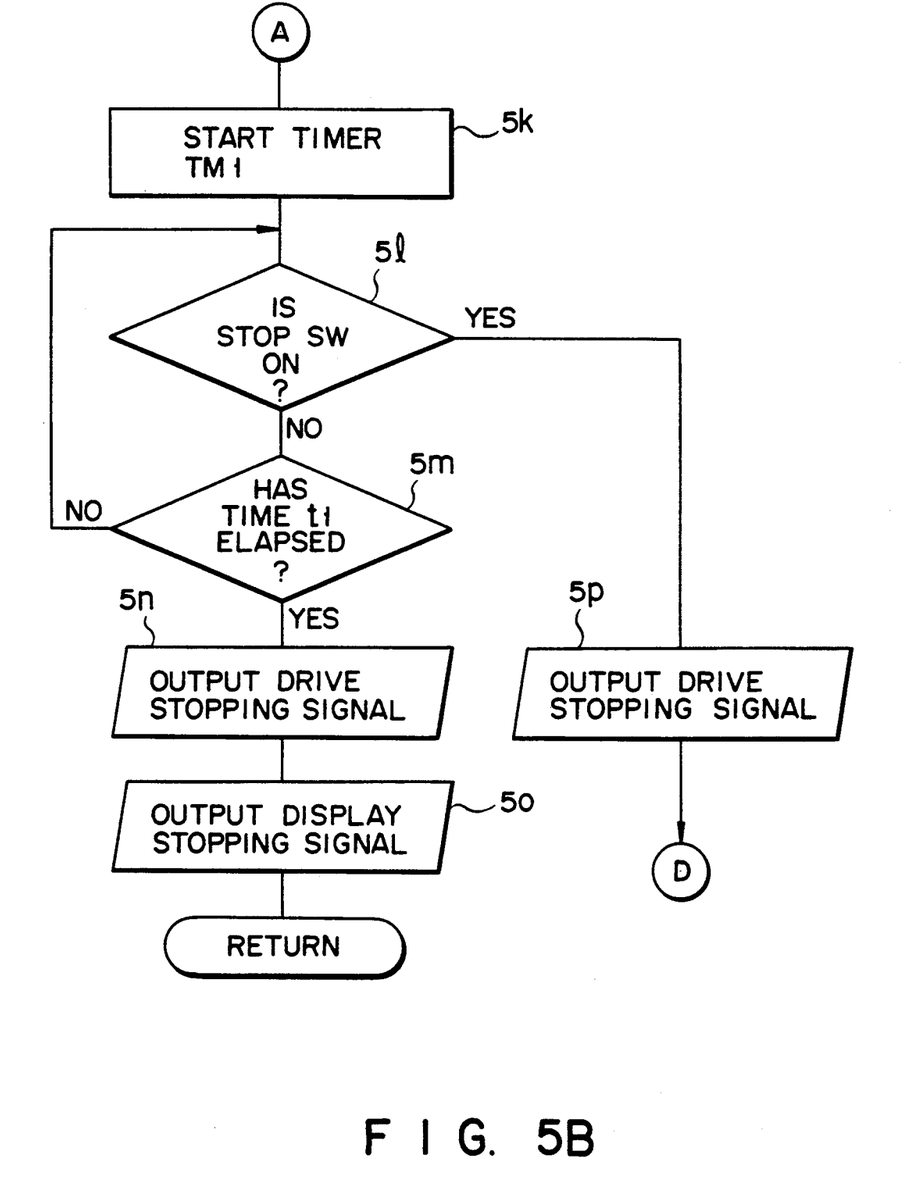

When the generation of the ringing tone and display of the message are initiated, CPU 41 carries out a process of disabling the ringing tone generation and message display. That is, as shown in FIG. 5B, a count start signal is output to timer (TM1) 45 in step 5k. Consequently timer 47 starts a count operation. Afterward, steps 5l and 5m are repeatedly performed. In step 5l, a decision is made as to whether stop switch 10 has been depressed or not. In step 5m, a decision is made as to whether or not a time-out signal has been generated by timer 47. Here, suppose that the user depresses stop switch 10. Then, a drive stop signal is output to loudspeaker driving circuit 6 in step 5n and moreover a display stop signal is output to LCD driving circuit 8 in step 5o. Therefore, the generation of ringing tone from loudspeaker 7 and the message display on LCD 9 are disabled. Even if stop switch 10 is not depressed, the time-out signal is generated by timer 47 after the elapse of a first time t1 (for example, ten seconds) from when the generation of the ringing tone and display of the message are initiated so that steps 5n and 5o are carried out. The generation of the ringing tone and display of the message are thus automatically stopped.

Suppose now that the user depresses display switch 11 so as to watch received messages stored in M-RAM 45 in the call waiting state. Then CPU 41 detects the operation of stop switch 11 in step 4b of FIG. 4 so that a display controlling process is carried out.

Figure 6A:
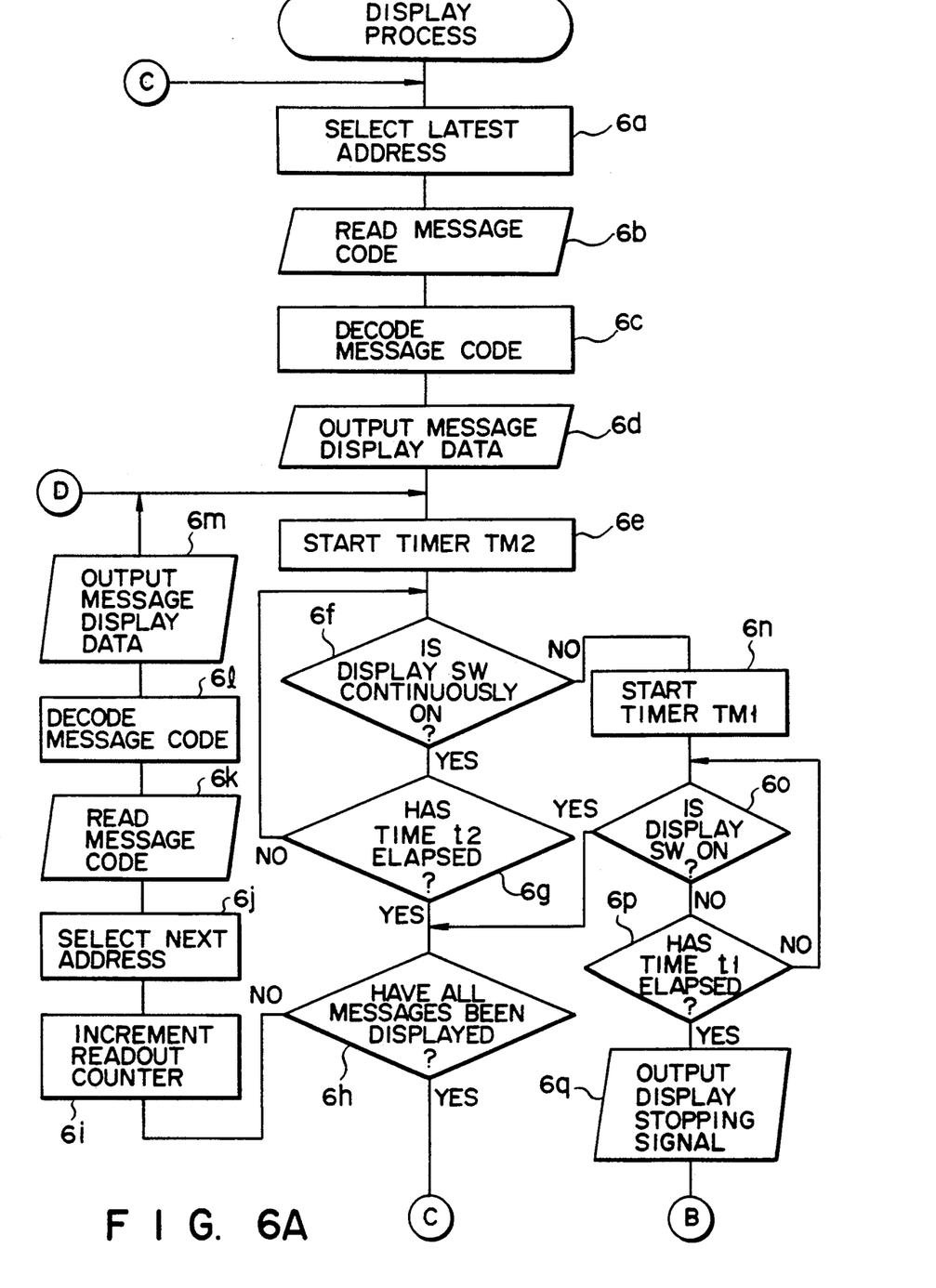

That is, as shown in FIG. 6A, an address of the first memory area that stores the latest received message is selected in step 6a. The selection of the address of the latest message is performed by reading out an address stored in address R1 of the second memory area of M-RAM 45 on the basis of the count of readout counter 46. In the example of FIG. 3 address C is selected as the address of the latest message. Next, in step 6b, message code M10 is read from an area of the first memory area of M-RAM 45 that corresponds to the address C. In subsequent step 6c, message code M10 is decoded so that message display data is produced. The message display data is output to LCD driving circuit 8 in step 6d. Thus, the received message corresponding to message code M10 is displayed on LCD 9.

When the display of the latest message is initiated, a count start signal is output to timer (TM2) 48 in step 6e. Thus, timer 48 starts a count operation. In step 6f, a decision is made as to whether or not display switch 11 is depressed continuously. Suppose now that display switch 11 is not depressed continuously by the user. Then, CPU 41 carries out step 6n so that a count start signal is output to timer (TM1) 47. As a result, timer 47 starts a count operation. On the initiation of the count operation by timer 47, steps 6o and 6p are repeated carried out. In step 6o, a decision is made as to whether or not display switch 11 is depressed and, in step 6p, a decision is made as to whether or not a time-out signal is output from timer 47. When the time-out signal is generated by timer 47, in other words, when the first time t1 (e.g., ten seconds) elapses from when the display of the latest message is initiated, a display stop signal is output to LCD driving circuit 8 in step 6q. Thus, the latest message is erased from LCD 9.

To the contrary, suppose that display switch 11 is depressed by the user during the first time t1 in order to retrieve and display the other message codes stored in M-RAM 45. Then, CPU 41 carries out a process of retrieving and displaying the other message codes stored in M-RAM 45. That is, in step 6h, a decision is made as to whether or not all the message codes stored in the first memory area of M-RAM 45 have been retrieved. Here, because all the message codes have not been retrieved yet, step 6i is carried out. In step 6i, readout counter 46 is incremented to R. In subsequent step 6j, address D is read from address R2 of the second memory area of M-RAM 45 on the basis of the count of readout counter 46. In subsequent step 6k, a message code is read from an area corresponding to address D of the first memory area of M-RAM 45. The message code is the second latest in the order of reception, which is message code M4 in the example of FIG. 2. The read message code M4 is decoded in step 6l, thereby producing message display data. The message display data is output to LCD driving circuit 8 in step 6m. Therefore, the message corresponding to message code M4 will be displayed on LCD 9 in place of the latest message corresponding to message code M10 displayed so far.

On the initiation of display of the second message, the count operation of timer 48 is started in step 6e. Subsequently, a decision is made, in step 6f, as to whether display switch 11 is depressed continuously. When display switch 11 is not depressed continuously, a count operation by timer 46 is started in step 6f. Subsequent steps 6o and 6p are repeatedly carried out. In step 6o, a decision is made as to whether display switch 11 is depressed or not and, in step 6p, a decision is made as to whether or not a time-out signal is generated by timer 46. If display switch 11 is depressed again, CPU 41 carries out steps 6h to 6m so that a display controlling process for the third latest received message is performed. CPU 41 likewise carries out steps 6h to 6m each time display switch 11 is depressed once. Accordingly, the message codes are read and displayed on LCD 9 one by one in the order reverse to the order in which they are received, in other words, on a first-in last-out basis, each time the user depresses display switch 11 once.

Suppose now that the user depresses display switch 11 continuously. Then, CPU 41 executes a process of sequential automatic retrieval of messages. That is, when the continuous operation of display switch 11 is detected in step 6f, the generation of a time-out signal from timer 47 is monitored in step 6g. when the second time t2 (e.g., one second) elapses from when a message is displayed on LCD 9 and thus a time-out signal is output from timer 47, steps 6i to 6m are carried out. Thereby, a message code is read from M-RAM 45 and displayed on LCD 9. Likewise message codes are sequentially read from M-RAM 45 one at a time at second-time (t2) intervals, i.e., at intervals of one second while display switch 11 is depressed. The message codes are sequentially decoded by CPU 41 and then displayed on LCD 9. In this case as well, the message codes are sequentially read from M-RAM 45 in the order reverse to the order in which they are received, i.e., on a first-in last-out basis. Therefore, by continuing depressing display switch 11 the user can confirm all the message codes stored in M-RAM 45.

Suppose that the user releases his hand from display switch 11 at a time when a desired message is displayed on LCD 9. Then, this operation is detected in step 6f so that subsequent steps 6n to 6q are carried out. Thus, the display state of the desired message on LCD 9 is held. The message is erased from LCD 9 when the first time t1 (ten seconds) elapses. Another message will be displayed if display switch 11 is depressed during the first time t1.

Figure 6B:
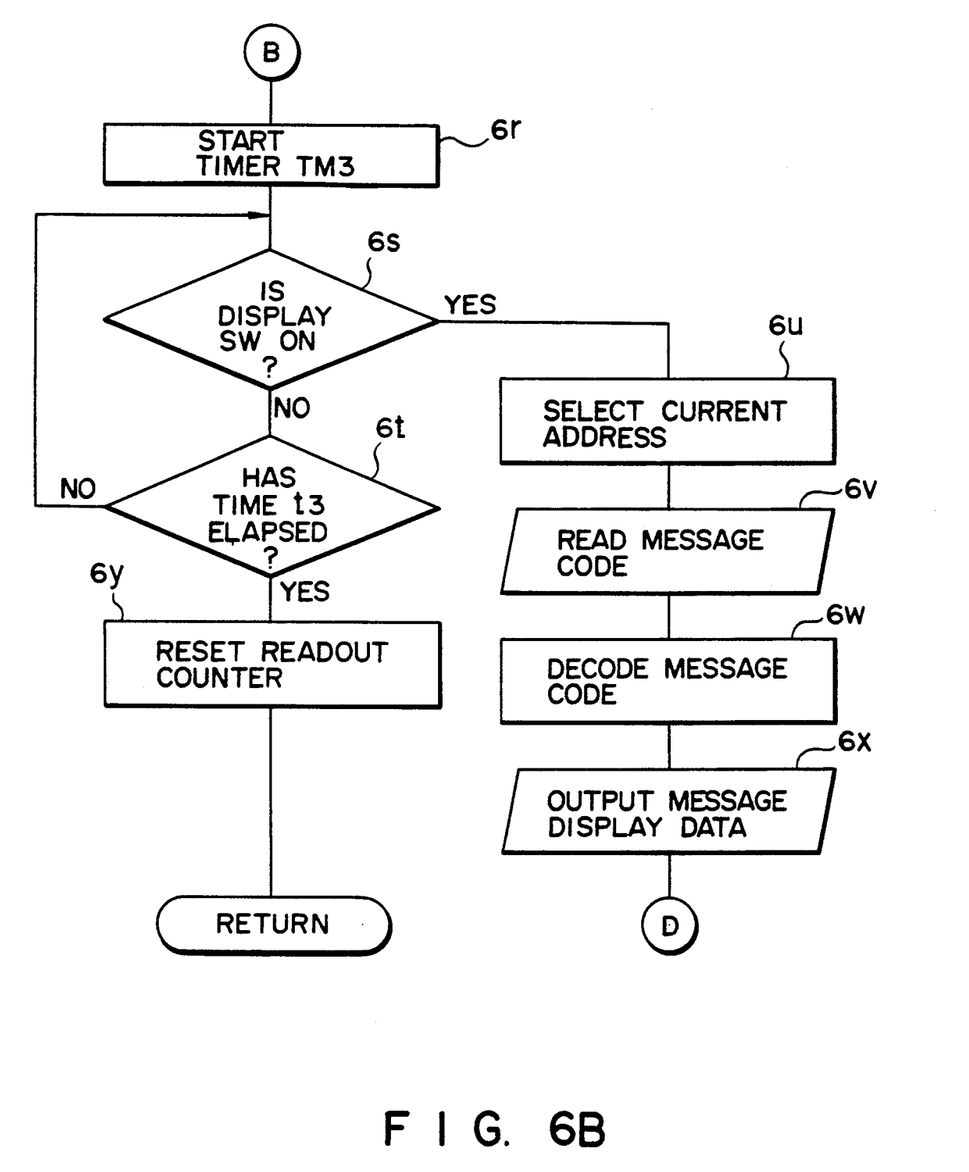

When the message is erased from LCD 9 in step 6q, CPU 41 executes a process of redisplay of the erased message. That is, as shown in FIG. 6B, a count start signal is applied to timer (TM3) 49 so that it starts a count operation in step 6r. Steps 6s and 6t are carried out next. In step 6s, a decision is made as to whether or not display switch 11 has been depressed. In step 6t, a decision is made as to whether or not a time-out signal has been generated from timer 49. Suppose now that, in order to display the erased message again, the user depresses display switch 11 until a third time t3 (for example, five seconds), which is the count time of timer 49, elapses. Then, in step 6u, the address in which the message code corresponding to the message erased from LCD 9 is stored is read from the second memory area of M-RAM 45 on the basis of the current count of readout counter 46. In subsequent step 6v, the message code is read from the area of the first memory area that corresponds to the address read from the second memory area in step 6u. The message code is decoded in step 6w, thereby providing message display data. The message display data is output to LCD driving circuit 8 in step 6x. Thus, the message corresponding to the message code is displayed on LCD 9 again. Accordingly, even if a message is automatically erased from LCD 9, the erased message can be displayed again instantly if the user depresses display switch 11 within the third time t3 (e.g., five seconds).

When the third time t3 elapses from when the message is erased form LCD 9, readout counter 46 is reset in step 6y. As a result, the pager receiver returns to the call waiting state. When display switch 11 is depressed in the call waiting state, a message which has been received last is displayed on LCD 9 as described previously. The sequence of events can be more clearly seen with reference to FIG. 8.

The pager receiver according to the present embodiment has the following advantages.

(1) Provided that display switch 11 continues to be depressed, message codes are automatically read from M-RAM 45 one at a time at second-time (t2) intervals and corresponding messages are sequentially displayed on LCD 9. Therefore, the user can watch all of the messages stored in M-RAM 45 briefly only by continuing depressing display switch 11 once in place of depressing it several times. Moreover, a desired message can be selected from a plurality of messages. Therefore, the number of operations of display switch 11 required to display the message can be decreased, thus improving operability. In addition, the time required to watch a plurality of messages briefly and the time required to select a desired message can be shortened. Accordingly, the user can confirm and select messages in a shorter time than in the prior art, thereby improving retrieval efficiency.

(2) A message displayed on LCD 9 can be automatically erased when the first time t1 elapses without operating stop switch 10. Therefore, unnecessarily continuous display of a message can be avoided. Thereby the waste of electric power can be avoided. Moreover, the secrecy of messages will not be lost.

(3) Even after a message has been automatically erased from LCD 9, the erased message can be displayed again if the display switch is depressed within the third time t3. Therefore, there is no need for the user to reretrieve a plurality of messages stored in M-RAM 45 from the beginning in order to redisplay the message erased once. This decreases the number of operations, improving operability. Also, the time required to redisplay the message erased once can be shortened, thereby improving the retrieval efficiency.

(5) The time required for CPU 41 to carry out various processes associated with the message display can be shortened so that effects on the call detecting process and the call informing process other than the display process are decreased.

Although the two switches, that is, the stop switch 10 and display switch 11, are employed in the aforementioned embodiment, a combination of these two switches may be used as a single switch. In this case, a message is displayed upon the depression of the single switch, sequentially varied upon continuous depression of that key and stops its display when messages in M-RAM 45 are all displayed on LCD 9.

Second Embodiment

Another embodiment in which the present invention is applied to a cordless telephone system will be described next. The cordless telephone system comprises a fixed device and a cordless telephone set. The fixed device is connected to an exchange through a subscriber's line. The fixed device and the cordless telephone set are connected to each other through a radio channel in a one-to-one correspondence.

Figure 7:
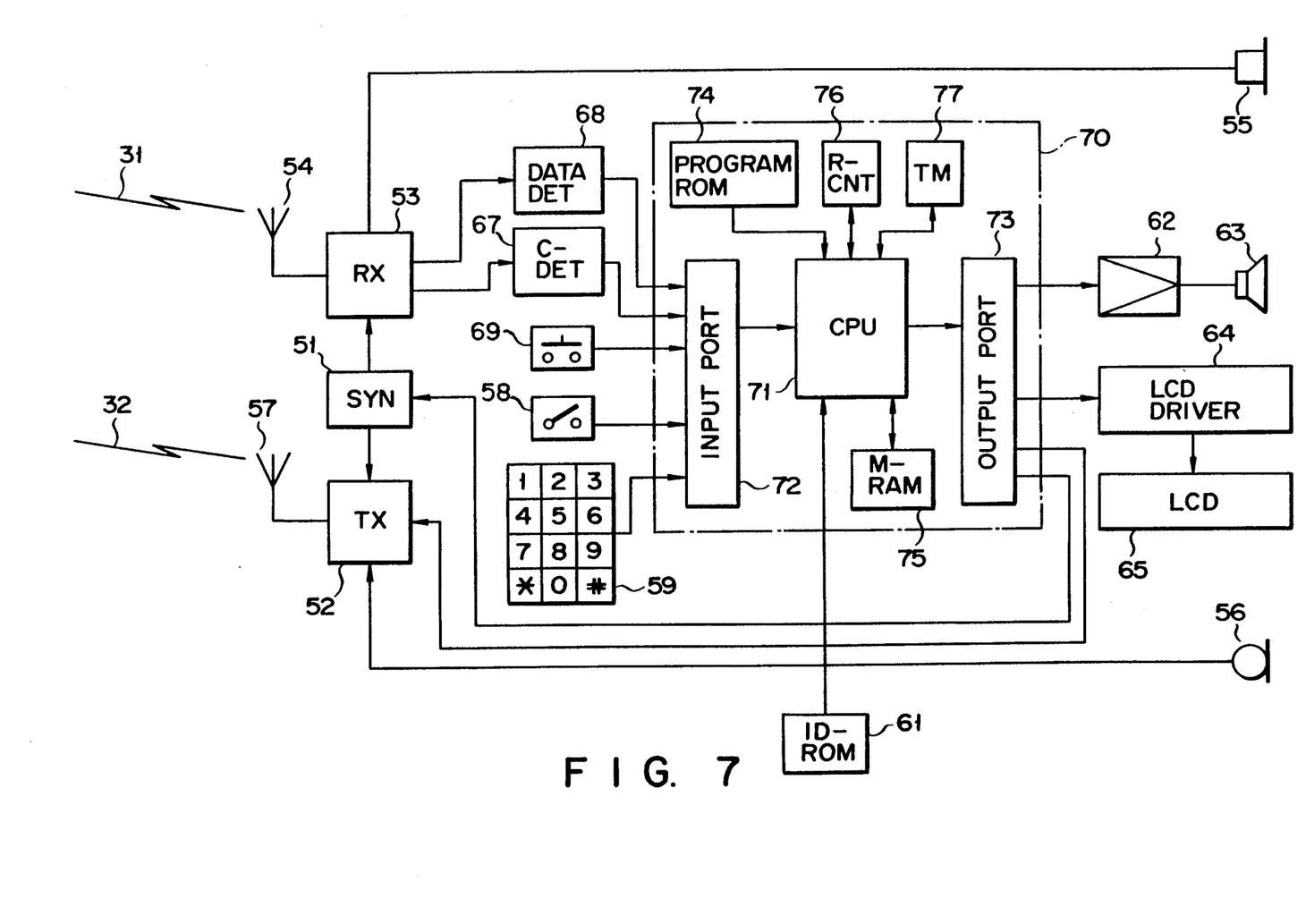
FIG. 7 is a block diagram of a cordless telephone according to a second embodiment of the present invention
Figure 8:
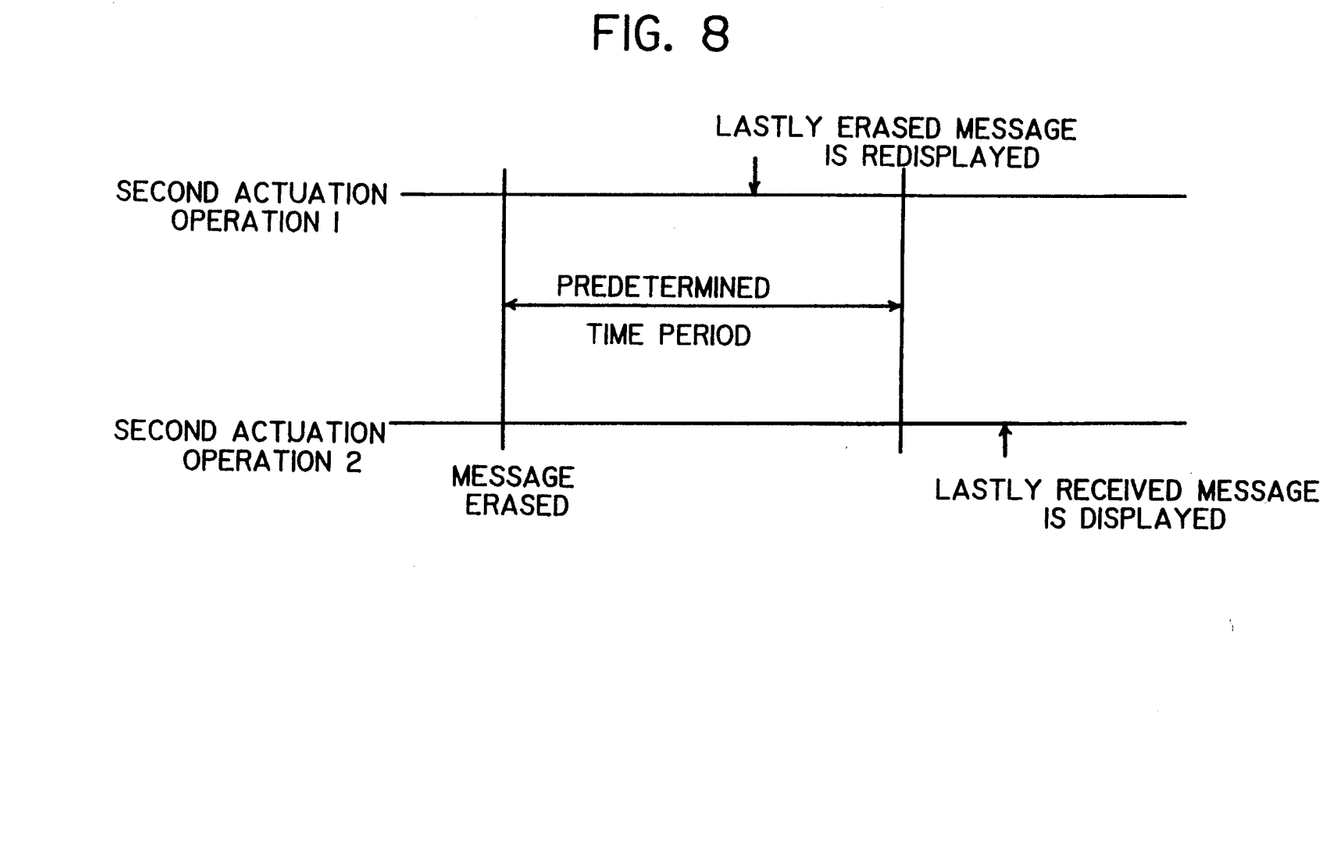

It is the cordless telephone set that is provided with the features of the present invention. FIG. 7 is a block diagram of the cordless telephone set. The cordless telephone set includes a synthesizer (SYN) 51, a transmitter (TX) 52 and a receiver (RX) 53. Synthesizer 51 specifies the frequencies of a transmit channel and a receive channel for transmitter 52 and receiver 53. A transmitting antenna 57 and a receiving antenna 54 are connected to transmitter 52 and receiver 53, respectively.

A radio speech signal transmitted from the fixed device not shown over receive channel 31 is received by receiver 53 through receiving antenna 54 to demodulate a speech signal. The speech signal output from receiver 53 is output from a loudspeaker 55 as voice. On the other hand, a voice input to a microphone 56 is converted to a speech signal and then applied to transmitter 52. In transmitter 52, the transmit channel carrier is modulated with the speech signal. The modulated carrier is transmitted from transmitting antenna 57 to the fixed device not shown over transmit channel 32.

The cordless telephone set is provided with a control circuit 70, which may be formed of a microcomputer comprising a central processing unit (CPU) 71, an input port 72, an output port 73, a program ROM 74, a message memory (M-RAM) 75, a readout counter (R-CNT) 76 and a timer (TM) 77. In program ROM 74 are stored various programs necessary for control operations of CPU 71. CPU 71 executes the control operations in accordance with those programs. To CPU 71 is connected an ID-ROM 61 which stores one of ID codes which have been assigned to cordless telephone sets in advance. When receiving radio-channel connecting data from the fixed device, CPU 71 checks an ID code contained in the received data with the ID code stored in ID-ROM 61.

Message memory 75 is formed of a RAM which has first and second memory areas. The first memory area has a plurality of message areas which store message codes transmitted from telephone devices of the other parties. The second memory area has address areas equal in number to the message areas. In those address areas are stored the addresses of the message areas in the order reverse to the order in which the message codes are received. Readout counter 76 designates the addresses of the second memory area in displaying the message codes stored in the first memory area in sequence. Timer 77 is formed of a programmable counter whose specific count value is specified by CPU 71. When supplied with a count start signal from CPU 71, timer 77 starts a count operation and produces a time-out signal when the specific count value is reached.

To input port 72 are connected a transmitting switch 58, dial keys 59, a received electric field detector (C-DET) 67, a data detector (DATADET) 68 and a display switch 69. Received electric field detector 67 is adapted to detect whether or not a radio wave has been transmitted from the fixed device and formed of a carrier squelch circuit or noise squelch circuit by way of example. Data detector 68 detects control data sent from the fixed device. Display switch 69 is used in reading a message code stored in M-RAM 75 selectively and displaying it on an LCD described later and is formed of a push button switch.

To output port 73 are connected a sounder driving circuit 62, an LCD driving circuit 64, synthesizer 51 and transmitter 52. A sounder 63 is connected to sounder driving circuit 62. Responsive to application of a driving signal from CPU 71, sounder driving circuit 62 drives sounder 63. Thereby, a ringing tone is sounded from sounder 63. A liquid crystal display (LCD) 65 is connected with LCD driving circuit 64. LCD driving circuit 64 drives the LCD in accordance with display data supplied from CPU 71. Therefore, on LCD 65 are displayed data corresponding to the display data, e.g., time, communication time, a telephone number entered from dial keys 59 and a message corresponding to the message code stored in M-RAM 75.

Next the operation of the device arranged as above will be described below.

First, suppose that user depresses transmission switch 58 in the waiting state so as to call a desired party. Then, CPU 71 performs a control operation to place transmitter 52 and receiver 53 in a continuous operating state. At this point, control radio channels are allocated to transmitter 52 and receiver 53. Next, CPU 71 produces control data containing the ID code stored in ID-ROM 61 and a transmission command. The control data is transmitted from transmitter 52 to the fixed device.

Upon receipt of the control data, the fixed device checks the ID code contained in the control data with the ID code stored in its ID-ROM. When a coincidence occurs between the ID codes, the radio channel between the fixed device and the cordless telephone set is switched to the radio channel for communication. Control data containing a response command and information for allocating the radio channels for communication to the cordless telephone set is produced, which is then transmitted to the cordless telephone set over the radio channel. A line switch is turned on to close the direct current loop of the subscriber' line. As a result, a dial tone arrives from the exchange which is in turn transmitted to the cordless telephone set over the radio channel for communication.

Upon the arrival of the control data containing the response command, CPU 71 of the cordless telephone set allocates radio channels for communication to transmitter 52 and receiver 53 in accordance with the allocation information for radio channels for communication contained in the control data. As a result, the cordless telephone set and the fixed device are connected to each other through the communication radio channels. Hence, the dial tone transmitted from the fixed device is received by receiver 53 of the cordless telephone set and emanated from loudspeaker 55. When the user of the cordless telephone set enters the telephone number of the telephone set of his called party using dial keys 59, data for the telephone number is applied from CPU 71 to transmitter 52 for transmission to the fixed device. In the fixed device, the line switch is driven on and off by the data, thereby transmitting dial pulses to the exchange. The exchange responds to the dial pulses to perform exchange operation. Thereby, the telephone of the called party is called. When the called party responds to the call by offhook, a communication path is formed between the telephone set of the called party and the cordless telephone set of the calling party, thus permitting communication between the parties.

Suppose now that a ringing signal is transmitted from the exchange to the fixed device over the subscriber's line in the waiting state. Then, in the fixed device, a radio channel for control is set and then control data containing the ID code and a command representing that ringing has been made is produced. The control data is then transmitted to the cordless telephone set over the control radio channel.

In the cordless telephone set, receiver 53 performs an intermittent receiving operation during the waiting state. To reduce power dissipation, the intermittent receiving operation is performed such that a receiving operation is performed for one second, for example, and the receiving operation is stopped for several seconds. When a radio wave is arrived from the fixed device in this state, it is received by receiver 53 and then detected by received electric field detecting circuit 66. Responsive to a detect signal from detecting circuit 66, CPU 71 places receiver 53 in a continuous receiving state. When the control data is transmitted from the fixed device in this state, it is received by receiver 53 and then applied to data detector 67. Data detector 67 detects the ID code and a command from the control data. The received ID code and command are supplied to CPU 71.

First, CPU 71 checks the received ID code with the ID code stored in ID-ROM 61. When a coincidence occurs between the ID codes as a result of checking, a process of connecting the cordless telephone set and the fixed device to each other with transmitting and receiving channels for communication is performed as follows. That is, first, CPU 71 outputs information for specifying the transmitting and receiving communication channels to synthesizer 51. Consequently, synthesizer 52 outputs carriers corresponding to the transmitting and receiving channels. Transmitter 52 and receiver 53 thus enables the transmission and reception between the fixed device and the cordless telephone set over the transmitting and receiving communication channels. Subsequently a driving signal for sounding a ringing tone is supplied from CPU 71 to sounder driving circuit 62. Sounder 63 is thus driven by sounder driving circuit 62 to produce the ringing tone. Hence, the user can be informed by the ringing tone that a call has been made.

When the user depresses transmission switch 58 to respond to the call, CPU 71 produces control data containing a call-responding command. The control data is then transmitted from transmitter 52 to the fixed device. Responsive to the call-responding command containing control data, the fixed device turns the line switch ON to close the direct current loop of the subscriber's line. As a result, the fixed device and the exchange are connected to each other, thereby forming a communication channel between the cordless telephone set and the telephone set of the calling party. Afterward, the user of the cordless telephone set is allowed to have a conversation with the calling party.

Suppose now that an answering service mode is set to the cordless telephone set. In this state, when the control data containing the calling command is sent from the fixed device, CPU 71 of the cordless telephone set executes processes of collating the ID codes and connecting the cordless telephone set to the fixed device with transmitting and receiving communication channels and then produces control data containing a call-responding command independently of the absence of operation of transmission switch 58. The control data is transmitted from transmitter 52 to the fixed device. Responsive to the return of the control data, the fixed device turns the line switch ON to close the direct current loop of the subscriber's line as described previously. Thus, a communication channel is formed between the cordless telephone set and the telephone device of the calling party.

In this state suppose that the calling party transmits message information such as his telephone number by a DTMF signal. Then, the DTMF signal is received by receiver 53 of the cordless telephone set and the message information represented by the DTMF signal is detected by data detector 67. CPU 71 executes a process of storing the message information in M-RAM 75. That is, a decision is first made as to whether or not there is an empty area in a plurality of message storage areas of M-RAM 75. If there is an empty area, the message information is written into the area. If there is no empty area, on the other hand, the receive-timing oldest message information of the plurality of pieces of message information stored in the message storage areas is replaced with the above message information.

Now, suppose that, in the wait state, the homecoming user depresses display switch 68 to confirm the message information stored in M-RAM 75. Then, CPU 71 executes a process of displaying the message information.

That is, the address of the message storage area that stores the latest received message code is selected first. The selection of the latest address is carried out by reading the address from an address of the address storage area of M-RAM 75 on the basis of the count of readout counter 76. Next, the message information is read from the area corresponding to the latest address of the message storage area of M-RAM 75. Subsequently the message code is decoded to produce message display data. The message display data is in turn output to LCD driving circuit 64. Thus, the message corresponding to the message code is displayed on LCD 65. When the message display is initiated, count information representing the first time t1 and a count start signal are output from CPU 71 to timer 77. Timer 77 thus starts a count operation to measure first time t1.

Suppose now that the user depresses display switch 11 continuously. Then, CPU 71 monitors timer 77 for the generation of a time-out signal therefrom. Suppose that the first time t1 (e.g., one second) elapses from when a message is displayed on LCD 65 and thus a time-out signal is output from timer 77. Then, the second latest message information is read from M-RAM 75 and displayed on LCD 65. Likewise, the pieces of message information are read from M-RAM 75 one at a time at first-time intervals (at one-second intervals) on a first-in last-out basis and displayed on LCD 65 while display switch 68 is depressed continuously. Accordingly, the user can confirm a plurality of pieces of message information stored in M-RAM 75 thoroughly by continuing depressing display switch 68.

Suppose that the user releases display switch 68 at a time when a desired message is displayed on LCD 65. Then, CPU 71 stops the sequential automatic message displaying process so that the desired message continues to be displayed on LCD 65. At this point a count value corresponding to second time t2 and a count start signal are output from CPU 71 to timer 77. Thus, timer 77 stops the count operation in the process of being executed and starts a count operation to measure the second time t2. The desired message is erased from LCD 65 when the second time t2 (e.g., ten seconds) elapses, and if display switch 68 is depressed within the second time t2, the message will be updated.

When the message is erased from LCD 65, CPU 71 executes a process of redisplaying the erased message. That is, first, the count value corresponding to the third time t3 and a count start signal are output from CPU 71 to timer 77. Timer 77 thus starts a count operation to measure third time t3. CPU 71 then monitors display switch 68 for its operation and timer 77 for generation of a time-out signal therefrom. Suppose that, in this state, the user depresses display switch 68 within third time t3 (e.g., five seconds). Then, CPU 71 selects the address of the message information just erased from LCD 65 on the basis of the current value of readout counter 74 and reads the message information from the message storage area of M-RAM 75 in accordance with the read address. The message information is decoded by CPU 71 so that message display information is produced. The message display data is supplied to LCD driving circuit 64. Thus, the message information just erased can be redisplayed on LCD 65. Accordingly, even if a given message has been automatically erased from LCD 65, the user is allowed to redisplay and watch the given message just erased instantly only by depressing display switch 68 once within third time t3 (e.g., five seconds).

As is the case with the previous embodiment, according to the cordless telephone set of the present embodiment, the continuous depression of display switch 68 allows a plurality of pieces of message information stored in M-RAM 75 to be automatically read one at a time at first-time (t1) intervals on a first-in last-out basis and to be displayed on LCD 65. Therefore, the user can watch all of pieces of message information stored in M-RAM 75 thoroughly only by depressing display switch 68 without depressing it many times. Furthermore, a desired message can be selected from a plurality of messages. Thus, the number of operations of display switch 68 required to display message information decreases, thereby improving operability. In addition, the time required to watch a plurality of pieces of message information thoroughly and the time required to select a desired message are shortened. Thus, the user can confirm and select message information more quickly than in the prior art, thereby improving the retrieval efficiency.

Moreover, even after a message has been automatically erased from LCD 65, display switch 68 has only to be depressed once to redisplay the erased message. Therefore, in order to redisplay the erased message information, there is no need for the user to reretrieve a plurality of pieces of message information stored in M-RAM 75 beginning with the last received message information. Thus, the number of operations of display switch 68 decreases so that the operability is improved. In addition, the time required to redisplay a message once erased is shortened so that the retrieval efficiency is improved.

Moreover, as described above, the time required to watch a plurality of pieces of message information thoroughly, the time required to selectively display a desired message and the time required to redisplay a message once erased are all shortened so that electric power dissipated for retrieving and displaying message information can be reduced. Thus, the dissipation of the battery of the wireless telephone can be suppressed, thereby increasing the life of the battery.

Also, the time required for CPU 71 to execute various processes associated with message information display can be decreased. Thus, effects on different processes including paging than the display processes can be decreased.

The present invention need not be limited to the above embodiments. For example, the present invention may be applied to automobile telephones and mobile telephones in addition to wireless telephones such as pager receivers and cordless telephones. Moreover, the present invention may be applied to wire telephones, facsimile equipment and data terminal equipment which are directly connected to lines such as subscriber's lines. In sum, the present invention may be applied to any of communication devices with features of storing message information received over a communication channel in a memory, reading the message information from the memory in response to operation of a display switch and displaying it on a display.

A plurality of message codes stored in a memory may be read in the order in which they are received, i.e., on a first-in first-out basis. Alternatively, the message codes may be read in the order of addresses independently of the order in which they are received. In addition, only the first read message code may be blinked on LCD or may be displayed with some mark. If done so, in selectively selecting and displaying a plurality of message codes stored in a memory the user can easily understand that all the messages have been selected and displayed thoroughly.

The intervals of time at which the message codes are read from the memory and displayed on the display in sequence when the display switch is depressed continuously may be set arbitrarily as specified by the user. In this case, the communication device may be provided with a means, such as a slide switch, for entering a specified time interval. An output of the switch is entered into the CPU, which in turn sets the specified time in the timer. If dial keys are provided as with the cordless telephone set shown in FIG. 7, the specified time interval could be entered using the dial keys.

Also, the message code storage procedure, the message code readout procedure, the type and configuration of the display and the type and configuration of the display switch might be modified in various ways without departing the scope of the present invention.

What is claimed is:

1. A radio telecommunication device comprising:

receiving means for receiving a signal containing a message;

storage means for storing a plurality of messages, each of which is obtained from a signal received by said receiving means;

display means for displaying at least one of the messages stored in said storage means;

a manually operable switch; and display control means for controlling the display means so that the messages stored in said storage means are sequentially displayed on said display means in response to a first actuation of said manually operable switch, the displayed message is erased in response to a termination signal;

means for redisplaying the message erased lastly on said display means upon detection of a second actuation of said manually operable switch within a predetermined time period from the time when the message is erased in response to the termination signal, and means for displaying the message received lastly by the receiving means on said display means upon a detection of a second actuation of said manually operable switch.

2. A tele-communication device according to claim 1, in which said display control means sequentially reads the messages stored in said storage means in the order reverse to the order they are received for subsequent display on said display means.

3. A radio tele-communication device according to claim 1, in which the termination signal is generated when a predetermined time period has passed from a time when a message starts to be displayed on the display means.

4. A radio tele-communication device according to claim 1, further comprising a manually operable stop switch and wherein a termination signal is generated when the manually operable stop switch is operated.

5. A method for operating a telecommunication device, the device including receiving means for receiving a signal containing a message; storage means for storing a plurality of messages, each of which is obtained from a signal received by said receiving means; display means for displaying at least one of the messages; and a manually operable switch for displaying the messages on said display means, the method comprising the steps of:
sequentially displaying the message stored in said storage means on said display means in response to a first actuation of said manually operable switch;
erasing the displayed message in response to a termination signal;
redisplaying the message erased lastly on said display means in the case that a second actuation of said manually operable switch is generated within a predetermined time period from the time when the message is erased in response to the termination signal; and
displaying the message received lastly by the receiving means on said display means in the case that the second actuation of said manually operable switch is generated after the predetermined time period has passed from the time when the message is erased in response to the termination signal.

6. In a radio telephone system including a fixed device, serving as a base station, connected to a subscriber's line and at least one of cordless telephone sets connected with the fixed device through at least one of radio channels, said cordless telephone set comprising:
receiving means for receiving a signal containing a message transmitted over said radio channel;
storage means for storing a plurality of messages, each of which is obtained from a signal received by said receiving means;
display means for displaying at least one of the messages;
a manually operable switch; and
display control means for controlling the display means so that the message stored in said storage means are sequentially displayed on said display means in response to a first actuation of said manually operable switch, the displayed message is erased in response to a termination signal;
means for redisplaying the message erased lastly on said display means upon a detection of a second actuation of said manually operable switch generated within a predetermined time period from the time when the message is erased in response to the termination signal;
means for displaying the message received lastly by the receiving means on said display means upon a detection of a second actuation of said manually operable switch after the predetermined time period has passed from the time when the message is erased in response to the termination signal.

* * * * *